United States Patent Office 3,316,431
Patented Apr. 25, 1967

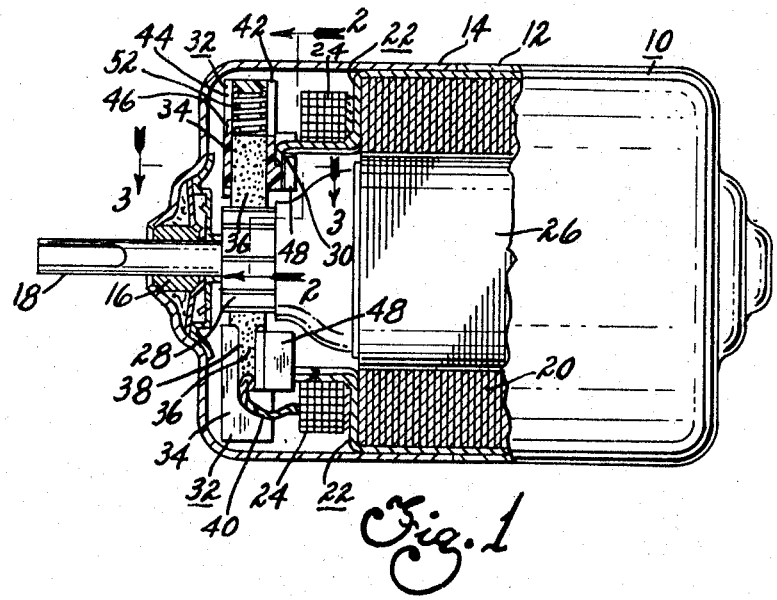

3,316,431
CURRENT COLLECTOR CONTACT MEANS
Arthur P. Manoni, Rochester, N.Y., assignor to General Motors Corporation, Detroit, Mich., a corporation of Delaware
Filed Feb. 8, 1965, Ser. No. 430,934
8 Claims. (Cl. 310—239)

This invention pertains to dynamoelectric machines, and particularly to improved current collector contact means therefor.

Heretofore, fractional horsepower dynamoelectric machines, such as direct current motors designed to operate automotive accessories, have embodied current collector contact means comprising a phenolic card, or plate, having a pair of metallic brush holders attached thereto, the plate being attached to a stationary part of the motor, with springs for biasing the brushes into engagement with a commutator, or current collecting member. Typical current collector contact means of the aforesaid type are disclosed in copending application Ser. No. 205,791, filed June 27, 1962, now Patent No. 3,264,506 in the name of Carlson et al., of common assignee. The present invention relates to improved current collector means wherein each brush spring performs the dual function of maintaining its brush in engagement with the commutator and maintaining its brush holder on a bracket in alignment with the commutator by the reaction force of the spring against the brush holder.

Accordingly, among my objects are the provision of improved current collector contact means for a dynamoelectric machine embodying dual function brush springs; the further provision of improved brush rigging structure for commutator-type dynamoelectric machines including wedge-shaped dovetail and key support means for the brush holders adapted to preclude brush holder vibration; and the still further provision of brush rigging of the aforesaid type wherein each brush holder is supported on a bracket by brush spring reaction and embodies means to remove the brush spring from engagement with the brush to facilitate motor assembly.

The aforementioned and other objects are accomplished in the present invention by utilizing integral plastic brush holders having wedge-shaped dovetail slots and keys adapted to receive complementary shaped supports, and wherein each brush holder includes a preloaded brush spring adapted to provide a reaction force to maintain its respective brush holder in fixed engagement with its support, which spring is releasable from its brush holder for biasing a brush into engagement with a commutator.

Further objects and advantages of the present invention will be apparent from the following description, reference being had to the accompanying drawing, wherein a preferred embodiment of the present invention is clearly shown.

In the drawing:

FIGURE 1 is a longitudinal side view, partly in section and partly in elevation, with certain parts broken away, of a dynamoelectric machine embodying the current collector contact means of the present invention.

FIGURE 2 is an enlarged fragmentary sectional view taken along line 2—2 of FIGURE 1.

FIGURE 3 is an enlarged fragmentary sectional view taken along line 3—3 of FIGURE 1.

Referring to FIGURE 1, the present invention is shown embodied in a direct current motor 10 having a frame comprising a pair of cup-shaped housings 12 and 14 suitably secured together. Each cup-shaped housing carries self-aligning bearing means 16 for rotatably supporting one end of an armature shaft 18. The motor includes a stator, or field assembly, comprising a stack of laminations 20 secured together by brackets 22 and carrying field coils 24. The shaft 18 is attached to a wound armature 26 having a drum-type commutator 28. The construction of the motor, except for the improved current collector contact means of the present invention, is essentially the same as disclosed in the aforementioned copending application Ser. No. 205,791, now Patent No. 3,264,-506.

Referring to FIGURES 2 and 3, each of the field assembly brackets 22 is formed with an integral or radially extending tongue, or tang, 30 of wedge-shaped dovetail construction with key slot 31. The current collector contact means comprises a pair of integral brush holders 32 arranged diametrically of the commutator 28, the brush holders preferably being composed of asbestos filled phenolic. Each brush holder 32 includes a brush guide, or box, portion 34 which is substantially square in cross-section for slidably supporting a brush 36 and having a side wall slot 38 for accommodating the brush pigtail 40. The brush box 34, of course, is open at the end adjacent the commutator 28 and is closed at the opposite end. In addition, the opposite side walls of the brush box adjacent its closed end are formed with slots 42 and 44, the slot 44 having a projection, or abutment, 46, the purpose of which will be described hereinafter.

In addition, each brush holder 32 is formed with an integral mounting flange 48 having an open sided wedge-shaped dovetail slot 50 and key 33 therein which is complementary to the wedge-shaped dovetail tang 30 on each of the brackets 22. When the brush holders are assembled with the brackets 22, the tangs 30 are snugly received in the slots 50 so as to support the brush holders in proper alignment against vibration and thus reduce motor noise.

In assembling the current collector contact means of the present invention, a coil-type brush spring 52 is inserted into each brush box against the closed end thereof with the opposite end of the brush spring in engagement with the abutment 46. In this manner the brush springs 52 are preloaded in the brush holders to facilitate motor assembly. The brushes 36 are inserted into the brush boxes 34 after which the brush holders are slidably mounted on the tangs 30 of the brackets 22. When the preloaded brush springs are released from abutment 46 they react against the brush holders thereby urging the brush holders in a direction away from the commutator to thus maintain the wedge-shaped dovetail tangs 30 in fixed engagement with their respective wedge-shaped dovetail slots 50 in the brush holders while urging the brushes against the commutator 28. Thus, it is apparent that the brush holder springs 52 perform the dual functions of maintaining their respective brush holders in fixed engagement with their supporting brackets due to the reaction force of each brush spring, as well as biasing the brushes into engagement with the commutator 28.

While the embodiment of the invention as herein disclosed constitutes a preferred form, it is to be understood that other forms might be adopted.

What is claimed is as follows:

1. In a dynamoelectric machine having a housing and a current collector member rotatably supported therein, current collector contact means within the housing comprising, a pair of brush holders, a brush slidably supported in each brush holder, a fixed brush holder support slidably engageable with each brush holder in a direction opposite to that of brush movement, and a brush spring in each brush holder adapted to urge its respective brush against said current collector member and maintain its respective brush holder in fixed engagement with said support.

2. In a dynamoelectric machine having a housing and a current collector member rotatably supported therein, current collector contact means within said housing comprising, a pair of brush holders, a brush slidably supported in each brush holder, a fixed brush holder support slidably engageable with each brush holder in a direction opposite to that of brush movement and in a plane parallel to its brush, and a spring in each brush holder adapted to maintain its respective brush holder in fixed engagement with said support by reaction against said brush holder and to urge its respective brush against said current collector member.

3. In a dynamoelectric machine having a housing and a current collector member rotatably supported therein, current collector contact means within said housing comprising, a pair of brush holders having brush boxes, a brush slidably supported in each brush box, a fixed brush holder slidably engageable with each brush holder in a direction opposite to that of brush movement, and a brush spring in each brush box adapted to urge its respective brush against said current collector member and maintain its respective brush holder in fixed engagement with said support by brush spring reaction.

4. In a dynamoelectric machine having a housing and a current collector member rotatably supported therein, current collector contact means within said housing comprising, a pair of brush holders having brush boxes, a brush slidably supported in each brush box, a fixed brush holder support slidably engaged with each brush holder in a direction opposite to that of brush movement, each brush box having an abutment, and a brush spring in each brush box engageable with said abutment so as to preload said spring, said spring being releasable from its respective abutment to urge its respective brush against said current collector member and maintain its respective brush holder in fixed engagement with said support by brush spring reaction.

5. In a dynamoelectric machine having a housing and a current collector member rotatably supported therein, current collector contact means within said housing comprising, a pair of brush holders, each brush holder having a mounting flange with a slot parallel to said brush box, a fixed brush holder support for each brush holder including a tongue slidably engageable with said slot in the mounting flange of its respective brush holder in a direction opposite to that of brush movement, and a brush spring in each brush box adapted to urge its respective brush against said current collector member and maintain its respective brush holder in fixed engagement with said support by brush spring reaction.

6. In a dynamoelectric machine having a housing and a current collector member rotatably supported therein, current collector means within said housing comprising, a pair of brush holders, each brush holder having a brush box with an open end, a closed end, a side wall slot and an abutment in said side wall slot, each brush box having a mounting flange with a slot parallel to said brush box, a fixed brush holder support for each brush holder including a tongue slidably engageable in the slot of each mounting flange in a direction opposite to that of brush movement, and a brush spring having one end engageable with the closed end of each brush box, each brush spring being engageable with its respective side wall abutment to preload the spring to facilitate assembly, and releasable from its abutment to urge its respective brush against said current collector member and maintain said respective brush holder in fixed engagement with said support by brush spring reaction.

7. The current collector contact means set forth in claim 6 wherein the slot in said mounting flange is of wedge-shaped, dovetail configuration.

8. The current collector contact means set forth in claim 7 wherein said tongue is of wedge-shaped, dovetail configuration.

No references cited.

MILTON O. HIRSHFIELD, *Primary Examiner.*

D. F. DUGGAN, *Assistant Examiner.*